US008995559B2

(12) United States Patent
Palanki et al.

(10) Patent No.: US 8,995,559 B2
(45) Date of Patent: Mar. 31, 2015

(54) SIGNALING MESSAGE TRANSMISSION IN A WIRELESS COMMUNICATION NETWORK

(75) Inventors: Ravi Palanki, San Diego, CA (US); Alexei Y. Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 934 days.

(21) Appl. No.: 12/411,258

(22) Filed: Mar. 25, 2009

(65) Prior Publication Data

US 2009/0245331 A1     Oct. 1, 2009

Related U.S. Application Data

(60) Provisional application No. 61/040,489, filed on Mar. 28, 2008.

(51) Int. Cl.
*H04L 27/00* (2006.01)
*H04L 27/10* (2006.01)
(Continued)

(52) U.S. Cl.
CPC .............. *H04L 27/10* (2013.01); *H04L 5/0053* (2013.01); *H04L 5/0091* (2013.01); *H04L 27/2647* (2013.01); *H04W 52/243* (2013.01); *H04W 52/245* (2013.01); *H04W 52/281* (2013.01); *H04W 52/32* (2013.01); *H04L 27/30* (2013.01)
USPC ........... 375/295; 375/148; 375/260; 375/267; 375/316

(58) Field of Classification Search
USPC ........................ 375/148, 260, 267, 295, 316
See application file for complete search history.

(56) References Cited

U.S. PATENT DOCUMENTS 5,940,743 A * 8/1999 Sunay et al. ............... 455/69
6,240,379 B1 * 5/2001 Yin ........................... 704/200.1
(Continued)

FOREIGN PATENT DOCUMENTS

CN      1826016 A      8/2006
CN      1890938 A      1/2007
(Continued)

OTHER PUBLICATIONS

International Search Report and Written Opinion—PCT/US2009/038526, International Search Authority—European Patent Office—Oct. 22, 2010.

(Continued)

*Primary Examiner* — Freshteh N Aghdam
(74) *Attorney, Agent, or Firm* — Paul Kuo

(57) ABSTRACT

Techniques for sending signaling messages in a wireless communication network are described. In an aspect, a signaling message (e.g., a reduce interference request) may be sent by mapping it to at least one specific subcarrier among a set of subcarriers reserved for sending the signaling message. The at least one subcarrier may be selected based on the message value. A signal may be sent on the at least one subcarrier in multiple symbol periods to convey the signaling message. In another aspect, a reduce interference request may be sent based on an orthogonal resource among orthogonal resources available for sending reduce interference requests. In one design, an orthogonal sequence may be selected based on the request and may be spread across a resource segment. In another design, the reduce interference request may be processed to obtain modulation symbols, and each modulation symbol may be spread across multiple subcarriers in one symbol period.

15 Claims, 11 Drawing Sheets

(51) Int. Cl.
*H04L 5/00* (2006.01)
*H04W 52/32* (2009.01)
*H04L 27/30* (2006.01)
*H04L 27/26* (2006.01)
*H04W 52/24* (2009.01)
*H04W 52/28* (2009.01)

(56) References Cited

U.S. PATENT DOCUMENTS

| | | | |
|---|---|---|---|
| 7,254,399 | B2 | 8/2007 | Salokannel et al. |
| 7,483,836 | B2 * | 1/2009 | Taori et al. ............ 704/500 |
| 7,567,791 | B2 | 7/2009 | Laroia et al. |
| 7,756,548 | B2 | 7/2010 | Laroia et al. |
| 8,064,393 | B2 | 11/2011 | Fukuoka et al. |
| 8,098,596 | B2 | 1/2012 | Kwon et al. |
| 8,102,882 | B2 | 1/2012 | Wang et al. |
| 8,331,249 | B2 | 12/2012 | Li et al. |
| 8,498,242 | B2 | 7/2013 | Luo et al. |
| 2004/0162097 | A1 * | 8/2004 | Vijayan et al. ............ 455/522 |
| 2005/0013345 | A1 | 1/2005 | Choi |
| 2005/0046592 | A1 * | 3/2005 | Cooper et al. ............ 340/855.7 |
| 2005/0250469 | A1 | 11/2005 | Laroia et al. |
| 2006/0067293 | A1 | 3/2006 | Santhoff et al. |
| 2006/0078040 | A1 * | 4/2006 | Sung et al. ............ 375/140 |
| 2006/0203711 | A1 | 9/2006 | Oh et al. |
| 2006/0203723 | A1 * | 9/2006 | Shirakabe et al. ............ 370/229 |
| 2007/0149229 | A1 | 6/2007 | Frederiksen et al. |
| 2008/0045158 | A1 | 2/2008 | Ji |
| 2008/0095108 | A1 | 4/2008 | Malladi et al. |
| 2008/0101447 | A1 | 5/2008 | Li et al. |
| 2009/0245195 | A1 | 10/2009 | Bhattad et al. |
| 2010/0216497 | A1 * | 8/2010 | Kawasaki ............ 455/501 |

FOREIGN PATENT DOCUMENTS

| | | |
|---|---|---|
| EP | 1542418 A1 * | 6/2005 |
| EP | 1542418 A1 | 6/2005 |
| JP | 2001148678 A | 5/2001 |
| JP | 2003124848 A | 4/2003 |
| JP | 2005039815 A | 2/2005 |
| JP | 2005244959 A | 9/2005 |
| JP | 2005252980 A | 9/2005 |
| JP | 2006254398 A | 9/2006 |
| JP | 2006340008 A | 12/2006 |
| JP | 2007514353 A | 5/2007 |
| JP | 2008017325 A | 1/2008 |
| JP | 2008244836 A | 10/2008 |
| WO | 2005060194 A1 | 6/2005 |
| WO | 2006087797 A1 | 8/2006 |
| WO | 2007035446 A1 | 3/2007 |
| WO | 2007073040 A1 | 6/2007 |
| WO | 2007147431 A1 | 12/2007 |
| WO | WO2008049136 | 4/2008 |
| WO | 2008058150 A2 | 5/2008 |
| WO | 2008121386 A2 | 10/2008 |
| WO | WO2009036217 | 3/2009 |

OTHER PUBLICATIONS

Lie-Liang Yang: "Time-Hopping Multicarrier Code-Division Multiple Access" IEEE Transactions on Vehicular Technology, vol. 56, No. 2, Mar. 1, 2007, pp. 731-741, XP011175776 Piscataway, NJ, USA ISSN: 0018-9545 sections I I. A , II.D figures 1, 2, 4, 5.

Partial International Search Report—PCT/US09/038526—International Search Authority—European Patent Office—Mar. 24, 2010.

Stantchev B et al: "An integrated FSK-signaling scheme for OFDM-based advanced cellular radio" IEEE 47th Vehicular Technology Conference (VTC), Held in Phoenix, AZ, USA, vol. 3, May 4, 1997-May 7, 2007, pp. 1629-1633, XP010229043 New York, NY, USA ISBN: 978-0-7803-3659-9 abstract section III figures 3, 4.

Arai, T., et al., "The Influence of the Partial Band Interference in Orthogonal Multicarrier M-ary/SSMA Systems," Technical Report of the Institute of Electronics, Information and Communication Engineers, Mar. 19, 1998, vol. 97, No. 610, pp. 25-30, SST97-118.

Atarashi H., et al., "Performance of VSF-OFCDM with Two-Dimensional Spreading Prioritizing Time Domain Spreading", Technical Report of the Institute of Electronics, Information and Communication Engineers, Jun. 21, 2002, vol. 102, No. 148, pp. 61-66, RCS2002-85.

Baidas, M.W., et al.,"The Performance of Coded Non-Coherent M-ary Orthogonal Keying Based OFDM Systems in a Frequency Selective and Fast Time-Varying Channel", Communications, 2007. ICC '07. IEEE International Conference, Jun. 28, 2007, pp. 2930-2935.

Cho J., et al., "A novel frequency-hopping spread-spectrum multiple-access network using M-ary orthogonal Walsh sequence keying", Communications, IEEE Transactions, Nov. 2003, vol. 51, No. 11, pp. 1885-1896.

Harada Y., et al., "Study on Delay Wave Canceller and Application to OFDM System," Technical Report of the Institute of Electronics, Information and Communication Engineers, Japan, The Institute of Electronics, Information and Communication Engineers, Nov. 1, 2007, RCS2007-101.

Iversen K., et al., "D2-ary Signaling for Incoherent All-Optical CDMA Systems", Information Theory, 1997. Proceedings., Jul. 4, 1997, pp. 484.

Yates, "A Framework for Uplink Power Control in Cellular Radio Systems", IEEE Journal on Selected Areas in Communications, vol. 13, No. 7, 1995, pp. 1341-1347.

\* cited by examiner

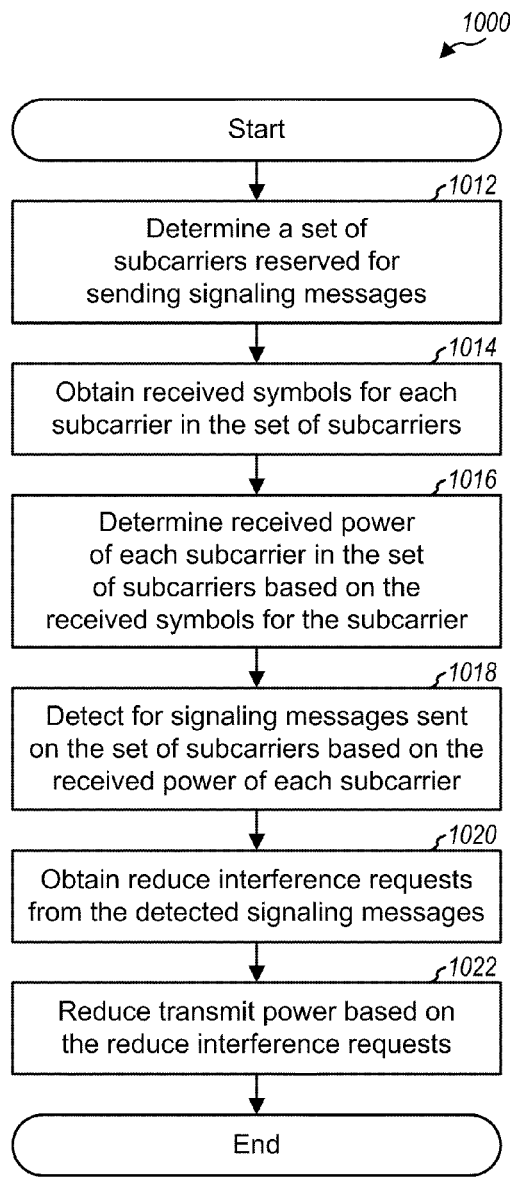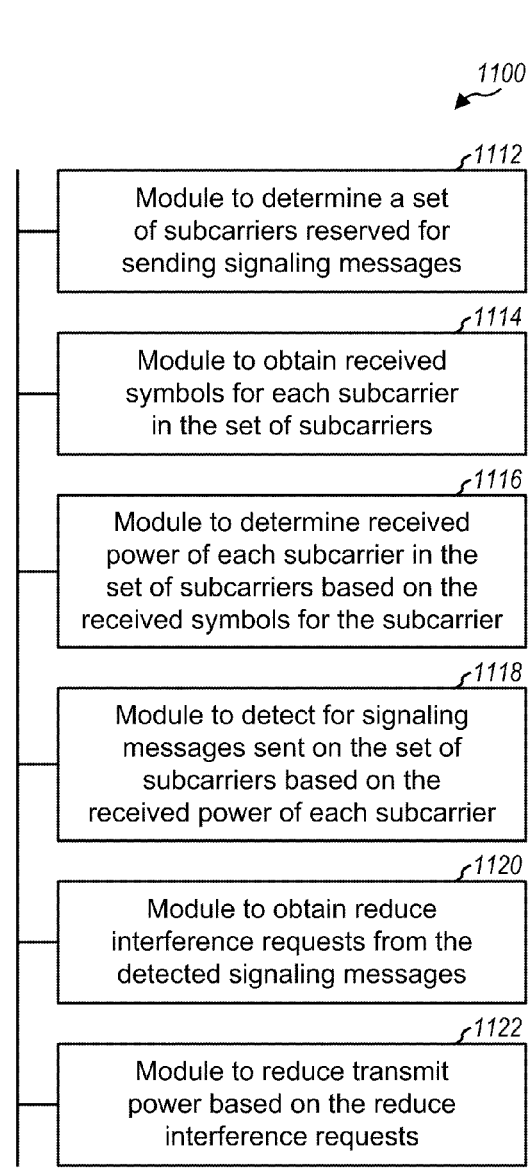
FIG. 10
FIG. 11

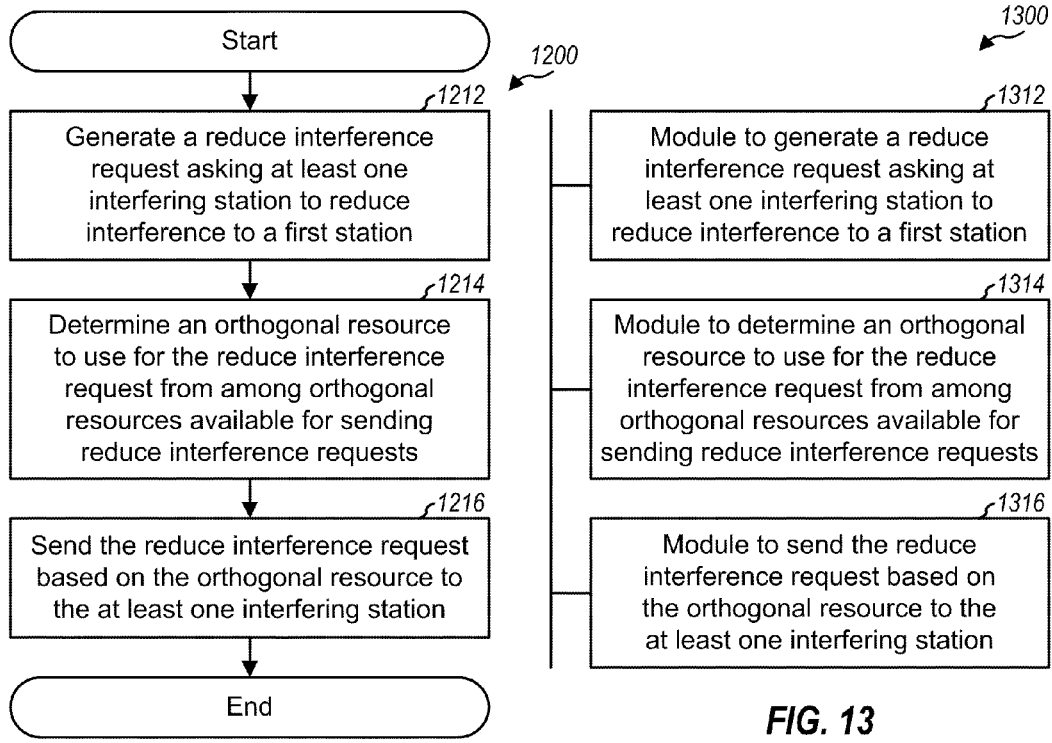
FIG. 12
FIG. 13
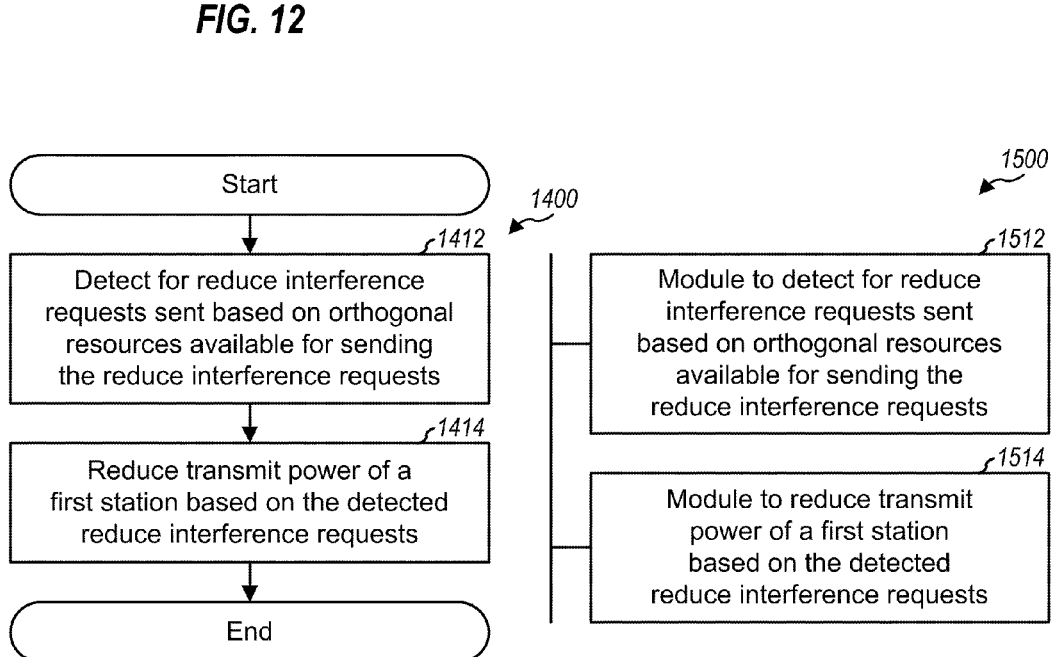
FIG. 14
FIG. 15

SIGNALING MESSAGE TRANSMISSION IN A WIRELESS COMMUNICATION NETWORK

The present application claims priority to provisional U.S. Application Ser. No. 61/040,489, entitled "ORTHOGONAL RESOURCE UTILIZATION MESSAGE (RUM) DESIGN," filed Mar. 28, 2008, assigned to the assignee hereof and incorporated herein by reference.

BACKGROUND

I. Field

The present disclosure relates generally to communication, and more specifically to techniques for sending and receiving signaling messages in a wireless communication network.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A base station may send signaling messages to a UE for various purposes. The UE may also send signaling messages to the base station for various purposes. The signaling messages may be useful to support communication between the base station and the UE. It is desirable to efficiently and reliably send signaling messages.

SUMMARY

Techniques for sending signaling messages in a wireless communication network are described herein. In an aspect, a signaling message may be sent by mapping it to at least one specific subcarrier among a set of subcarriers reserved for sending the signaling message. The signaling message may have one of multiple possible values. The signaling message may be sent on at least one specific subcarrier selected from the set of subcarriers based on the message value. In one design, the signaling message may be a reduce interference request asking at least one interfering station to reduce interference to a transmitter station. The transmitter station may select at least one subcarrier in the set of subcarriers based on the signaling message. The transmitter station may send a signal (e.g., a phase-continuous signal) on each selected subcarrier in multiple symbol periods to convey the signaling message. A receiver station may perform the complementary processing to detect for the signaling message.

In another aspect, a reduce interference request may be sent based on an orthogonal resource among all orthogonal resources (e.g., code, time, frequency and/or other resources) available for sending reduce interference requests. In one design, a first station may generate a reduce interference request asking at least one interfering station to reduce interference to the first station. The first station may spread the reduce interference request across a resource segment based on an orthogonal sequence. The resource segment may cover multiple subcarriers in multiple symbol periods. In one orthogonal design, M possible values of the reduce interference request may be mapped to M orthogonal sequences, e.g., Walsh sequences. The first station may select an orthogonal sequence based on the reduce interference request and may map the selected orthogonal sequence across the resource segment. In another orthogonal design, the first station may process (e.g., encode and modulate) the reduce interference request to obtain modulation symbols and may spread each modulation symbol to obtain a corresponding data sequence. The first station may send each data sequence across a set of subcarriers in one symbol period to achieve frequency spreading. For both orthogonal designs, the first station may generate a signal comprising the reduce interference request spread across the resource segment and may send the signal to the at least one interfering station. An interfering station may perform the complementary processing to detect for the reduce interference request.

Various aspects and features of the disclosure are described in further detail below.

BRIEF DESCRIPTION OF THE DRAWINGS

FIG. 10 shows a process for receiving signaling with subcarrier mapping.

FIG. 11 shows an apparatus for receiving signaling with subcarrier mapping.

FIG. 12 shows a process for sending signaling with spreading.

FIG. 13 shows an apparatus for sending signaling with spreading.

FIG. 14 shows a process for receiving signaling sent with spreading.

FIG. 15 shows an apparatus for receiving signaling sent with spreading.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
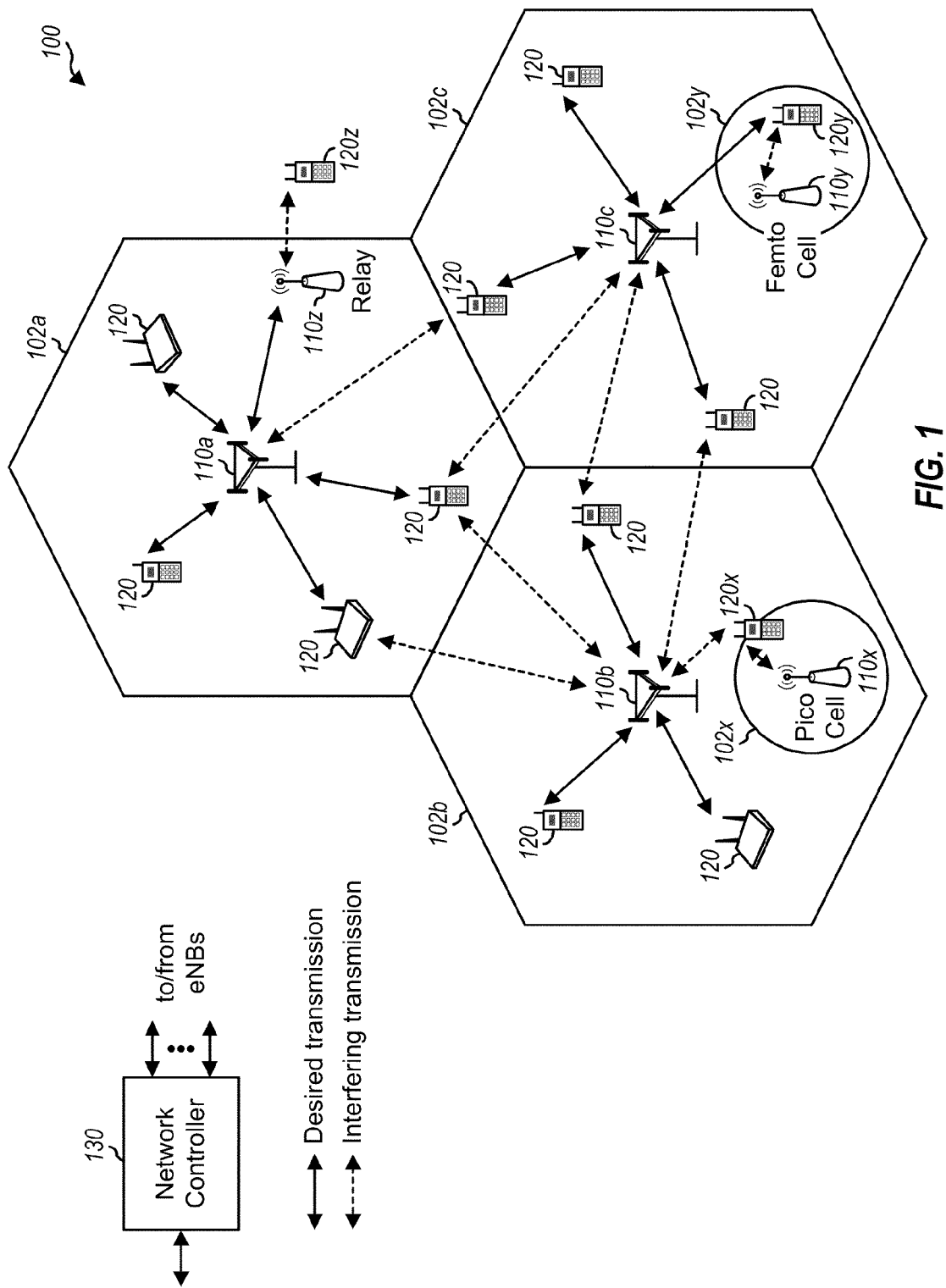
FIG. 1 shows a wireless communication network.

FIG. 1 shows a wireless communication network 100, which may include a number of base stations 110 and other network entities. A base station may be a station that communicates with the UEs and may also be referred to as a Node B, an evolved Node B (eNB), an access point, etc. Each base station 110 may provide communication coverage for a particular geographic area. The term "cell" can refer to a coverage area of a base station and/or a base station subsystem serving this coverage area.

A base station may provide communication coverage for a macro cell, a pico cell, a femto cell, etc. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell. A base station for a macro cell may be referred to as a macro base station. A base station for a pico cell may be referred to as a pico base station. A base station for a femto cell may be referred to as a femto base station or a home base station.

In the example shown in FIG. 1, base stations 110a, 110b and 110c may be macro base stations for macro cells 102a, 102b and 102c, respectively. Base station 110x may be a pico base station for a pico cell 102x. Base station 110y may be a femto base station for a femto cell 102y. The pico cells and femto cells may be located within the macro cells (e.g., as shown in FIG. 1) and/or may overlap the macro cells.

Wireless network 100 may also include relay stations, e.g., a relay station 110z. A relay station (or relay) is a station that receives a transmission of data and/or other information from an upstream station and sends a transmission of the data and/or other information to a downstream station. A network controller 130 may couple to a set of base stations and provide coordination and control for these base stations. Network controller 130 may be a single network entity or a collection of network entities.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with a base station via the downlink and uplink. The downlink (or forward link) refers to the communication link from the base station to the UE, and the uplink (or reverse link) refers to the communication link from the UE to the base station. A UE may be able to communicate with macro base stations, pico base stations, femto base stations, relays, etc. In FIG. 1, a solid line with double arrows indicates desired transmissions between a UE and a serving base station, which is a base station designated to serve the UE on the downlink and/or uplink. A dashed line with double arrows indicates interfering transmissions between a UE and a base station.

Wireless network 100 may be a homogeneous network that includes only macro base stations. Wireless network 100 may also be a heterogeneous network that includes base stations of different types, e.g., macro base stations, pico base stations, femto base stations, relays, etc. These different types of base stations may have different transmit power levels, different coverage areas, and different impact on interference in wireless network 100. For example, macro base stations may have a high transmit power level (e.g., 20 Watts) whereas pico and femto base stations may have a lower transmit power level (e.g., 1 Watt). The techniques described herein may be used for homogeneous and heterogeneous networks.

Wireless network 100 may be a synchronous network or an asynchronous network. In a synchronous network, the base stations may have similar frame timing, and transmissions from different base stations may be aligned in time. In an asynchronous network, the base stations may have different frame timing, and transmissions from different base stations may not be aligned in time. The techniques described herein may be used for synchronous and asynchronous networks.

Wireless network 100 may utilize orthogonal frequency division multiplexing (OFDM) and/or single-carrier frequency division multiplexing (SC-FDM). For example, wireless network 100 may be an LTE network that utilizes OFDM on the downlink and SC-FDM on the uplink. OFDM and SC-FDM partition the system bandwidth into multiple ($N_{FFT}$) subcarriers, which may also be referred to as tones, bins, etc. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 MHz, respectively.

A UE may communicate with a serving base station in a dominant interference scenario, which may be characterized by the interference power being higher than the desired signal power. On the downlink, the UE may observe high interference from one or more interfering base stations. On the uplink, the serving base station may observe high interference from one or more interfering UEs. A dominant interference scenario may be due to range extension, which is a scenario in which a UE connects to a base station with lower pathloss and lower geometry among multiple base stations detected by the UE. For example, UE 120x in FIG. 1 may communicate with pico base station 110x with lower pathloss and lower geometry and may observe high interference from macro base station 110b. This may be desirable to reduce interference to the wireless network to achieve a given data rate for the UE. A dominant interference scenario may also be due to restricted association, which is a scenario in which a UE is unable to connect to a strong base station with restricted access and may then connect to a weaker base station with unrestricted access. For example, UE 120y in FIG. 1 may be unable to connect to femto base station 110y and may then connect to macro base station 110c. UE 120y may observe high interference from femto base station 110y and may also cause high interference to the femto base station.

Interference mitigation may be used to mitigate (e.g., to avoid or reduce) interference on a given link in order to improve performance of data transmission. Interference mitigation may also be used to provide cell splitting gains. For example, a macro base station may reserve resources that may be used by multiple pico base stations to simultaneously serve different UEs. For interference mitigation, an interfering station may blank or reduce its transmit power or may beamsteer its transmission so that higher received signal quality can be achieved for a desired transmission for a target station. In the description herein, a station may be a base station, a UE, a relay, etc. Received signal quality may be quantified by signal-to-noise-and-interference ratio (SINR) or some other metric.

Figure 2:
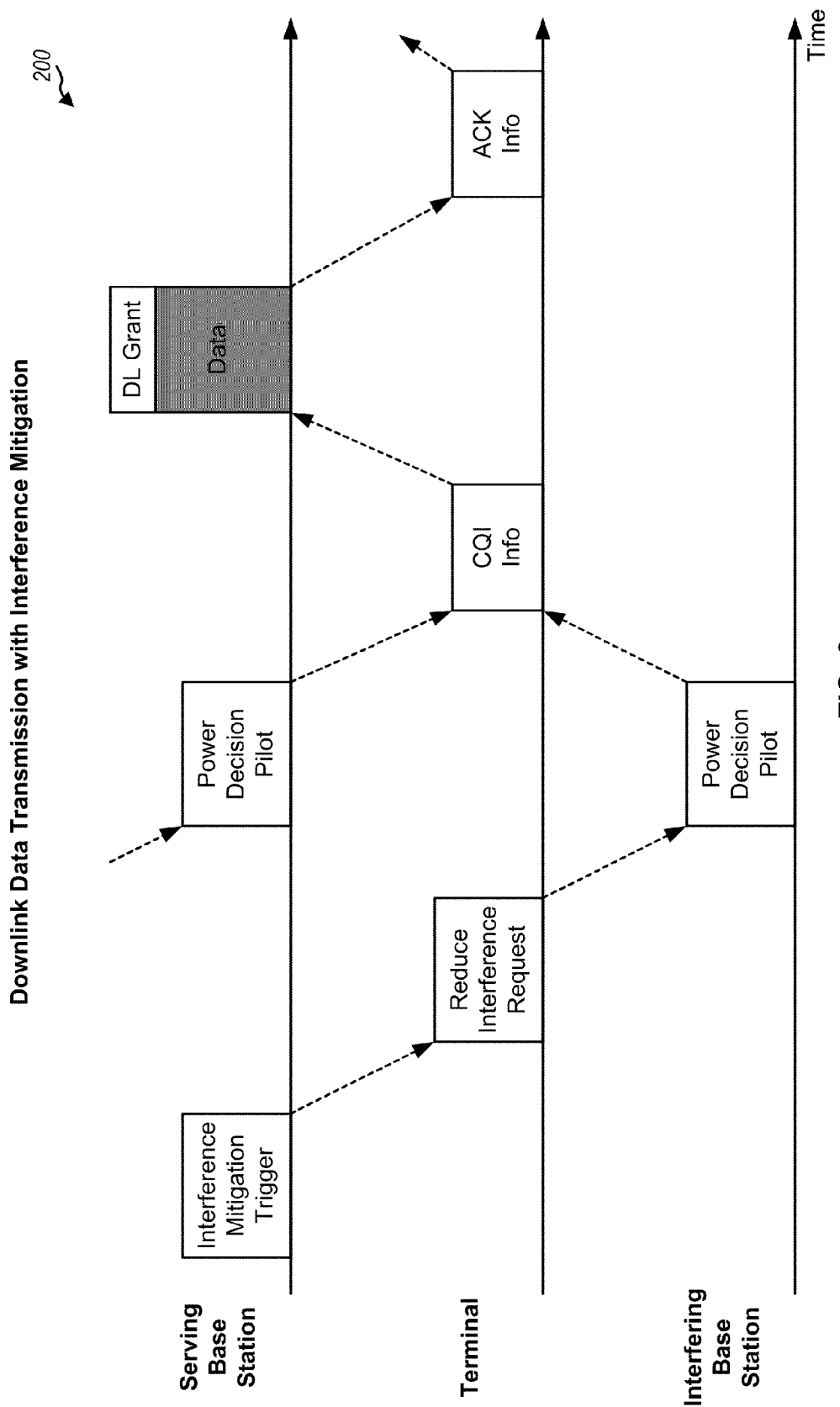
FIG. 2 shows downlink data transmission with interference mitigation.

FIG. 2 shows a design of a downlink data transmission scheme 200 with interference mitigation. A serving base station may have data to send to a UE and may have knowledge that the UE is observing high interference on the downlink. For example, the serving base station may receive pilot measurement reports from the UE, and the reports may indicate and/or identify strong interfering base stations. The serving base station may send an interference mitigation trigger to the UE. This trigger may invoke the UE to request interfering base stations to reduce interference on the downlink. This trigger may also convey specific resources on which to reduce interference, the priority of the request, and/or other information.

The UE may receive the interference mitigation trigger from the serving base station and may send a reduce interference request. The reduce interference request may also be referred to as a resource utilization message (RUM). The UE may send the reduce interference request (i) as a unicast message to only strong interfering base stations or (ii) as a broadcast message to all neighbor base stations. The reduce interference request may ask the interfering base stations to reduce interference on specified resources and may also convey the priority of the request, a target interference level for the UE, and/or other information.

An interfering base station may receive the reduce interference request from the UE and may grant or dismiss the request. If the request is granted, then the interfering base station may adjust its transmit power and/or steer its transmission in order to reduce interference to the UE. In one design, the interfering base station may determine a transmit power level $P_d$ that it will use on the specified resources based on various factors such as its buffer status, the priority of the request, the target interference level of the UE, etc. The interfering base station may then transmit a power decision pilot at a power level of $P_{pdp}$, where $P_{pdp}$ may be equal to $P_d$ or a scaled version of $P_d$.

The UE may receive power decision pilots from all interfering base stations and the serving base station. The UE may estimate the SINR of the specified resources based on the received pilots, determine channel quality indicator (CQI) information based on the SINR estimates, and send the CQI information to the serving base station.

The serving base station may receive the CQI information from the UE and may schedule the UE for data transmission on assigned resources, which may include all or a subset of the specified resources. The serving base station may select a modulation and coding scheme (MCS) based on the CQI information and may process a data packet in accordance with the selected MCS. The serving base station may generate a downlink (DL) grant, which may include the assigned resources, the selected MCS, etc. The serving base station may send the downlink grant and a packet transmission to the UE. The UE may receive the downlink grant and the packet transmission and may decode the received transmission in accordance with the selected MCS. The UE may then generate acknowledgement (ACK) information, which may indicate whether the packet was decoded correctly or in error by the UE, and may send the ACK information to the serving base station.

Figure 3:
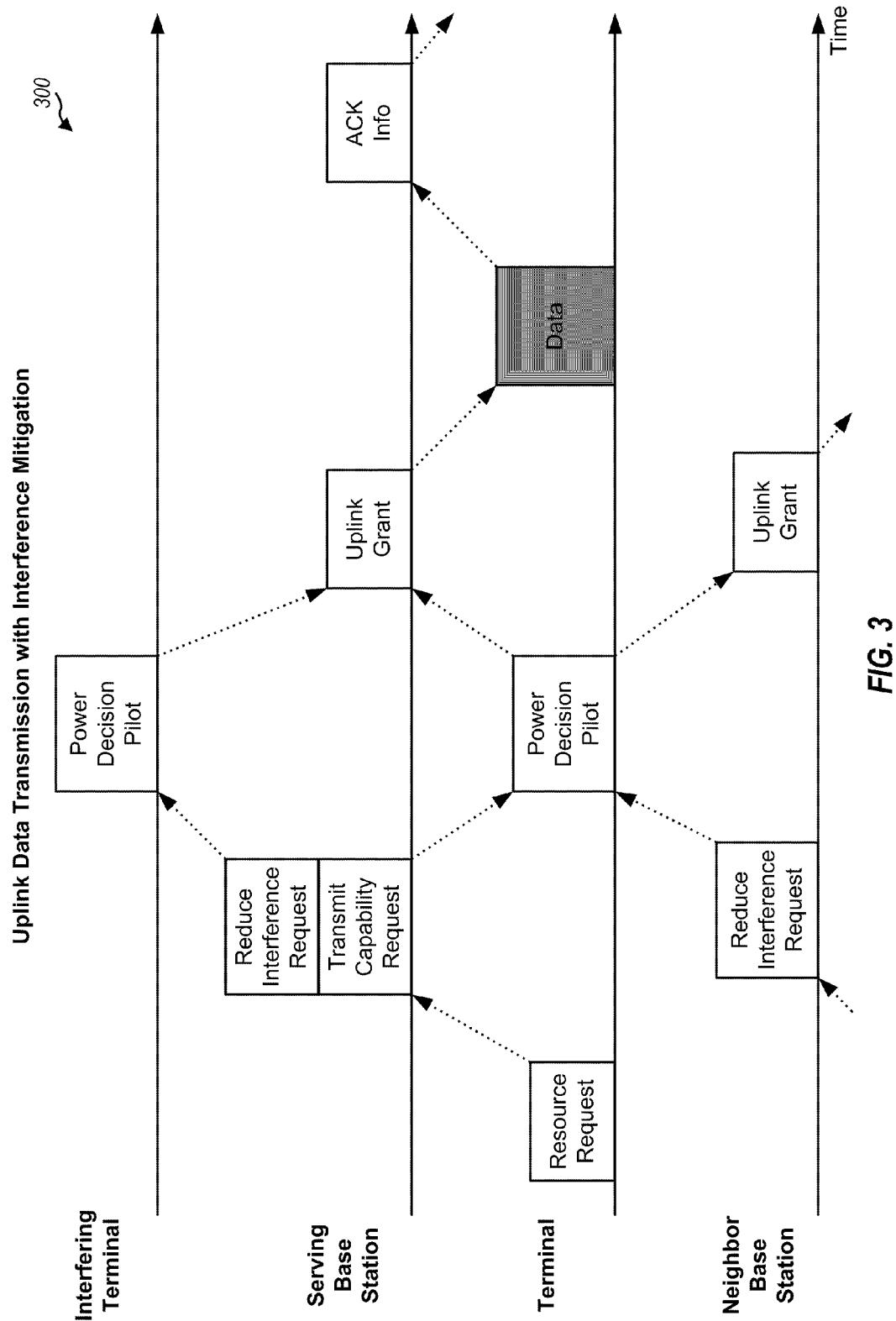
FIG. 3 shows uplink data transmission with interference mitigation.

FIG. 3 shows a design of an uplink data transmission scheme 300 with interference mitigation. A UE may have data to send to a serving base station and may send a resource request. The resource request may indicate the priority of the request, the amount of data to send by the UE, etc. The serving base station may receive the resource request and may send a transmit capability request to the UE to ask for the transmit capability of the UE on specific resources. The serving base station may also send a reduce interference request to ask interfering UEs to reduce interference on the specific resources. The serving base station may send the reduce interference request (i) as a unicast message to only strong interfering UEs or (ii) as a broadcast message to all interfering UEs.

The UE may receive the transmit capability request from the serving base station and may also receive a reduce interference request from a neighbor base station. The UE may determine the transmit power level that it can use on the specified resources based on the reduce interference request from the neighbor base station. The UE may convey this transmit power level via a power decision pilot.

The serving base station may receive the power decision pilots from the UE as well as the interfering UEs. The serving base station may estimate the SINR of the specified resources based on the received pilots and may select an MCS for the UE based on the SINR estimates. The serving base station may generate and send an uplink grant, which may include the selected MCS, the assigned resources, the transmit power level to use for the assigned resources, etc. The UE may receive the uplink grant, process a packet in accordance with the selected MCS, and send a packet transmission on the assigned resources. The serving base station may receive the packet transmission from the UE, decode the received transmission, determine ACK information based on the decoding result, and send the ACK information to the UE.

As shown in FIGS. 2 and 3, various signaling messages may be sent on the downlink and uplink in order to support interference mitigation. Each signaling message may include any type of information. For example, a reduce interference request may include some or all of the following information:

Resource index—identify resources on which less interference is requested,

Priority level—indicate priority of the reduce interference request,

Spatial feedback information—used to beamsteer away from the sender, and

Transmitter identity (ID)—identify the sender of the reduce interference request.

A reduce interference request may also include different and/or additional information.

A signaling message of a particular type (e.g., a reduce interference request) may be sent on resources that may be reserved for sending signaling messages of that type. Resources may be reserved in various manners. In one design, the reserved resources may comprise frequency resources that may be available all the time. This design may be especially applicable for an asynchronous network. In another design, the reserved resources may comprise specific time and frequency resources. This design may be more applicable for a synchronous network.

Figure 4A:
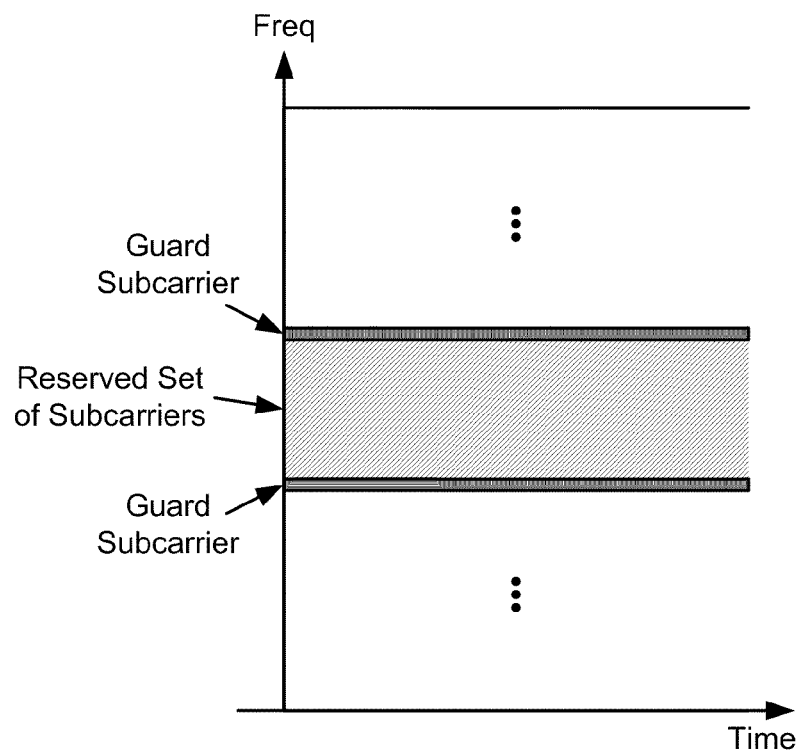
FIGS. 4A and 4B show frequency resources reserved for signaling messages.

FIG. 4A shows a design of reserving frequency resources for sending signaling messages of a particular type, e.g., reduce interference requests. In this design, a set of contiguous subcarriers may be reserved for sending the signaling messages. In general, the set of subcarriers may be located anywhere within the system bandwidth. In one design, one or more guard subcarriers may be used to protect/isolate the reserved subcarriers from the non-reserved subcarriers used for sending data, etc. For example, one guard subcarrier may be used on each side of the reserved subcarriers, as shown in FIG. 4A. The guard subcarriers may protect a signaling message sent on the reserved subcarriers from inter-carrier interference (ICI) due to transmissions on the non-reserved subcarriers, which may improve detection of the signaling message.

Figure 4B:
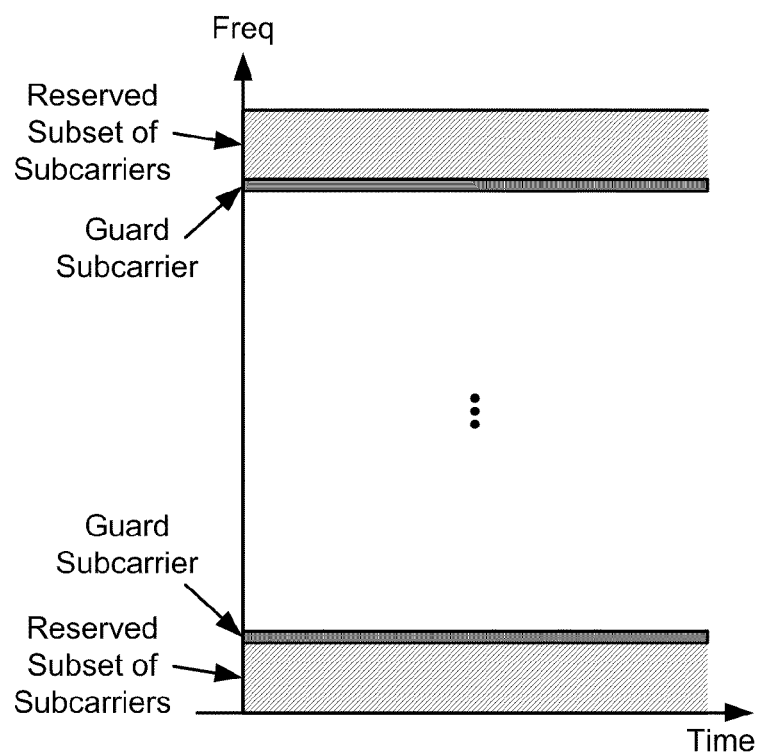

FIG. 4B shows another design of reserving frequency resources for sending signaling messages of a particular type, e.g., reduce interference requests. In this design, a set of subcarriers may be reserved for sending the signaling messages and may comprise two subsets of contiguous subcarriers. Each subset may include half of the reserved subcarriers. In general, the subsets of subcarriers may be located anywhere within the system bandwidth. In the design shown in FIG. 4B, the two subsets are located at the two edges of the system bandwidth. In one design, one or more guard subcarriers may be used to protect each subset of reserved subcarriers from the non-reserved subcarriers, as shown in FIG. 4B.

FIGS. 4A and 4B show two exemplary designs of reserving frequency resources for sending signaling messages of a particular type. Time and/or frequency resources may also be reserved in other manners for sending signaling messages. For example, more than two subsets of subcarriers may be reserved for sending signaling messages.

In one design, different resources (e.g., different sets of subcarriers, different blocks of time-frequency resources, etc.) may be reserved for sending signaling messages (e.g., reduce interference requests) by base stations of different power classes. In another design, different resources be may reserved for sending signaling messages at different transmit power levels. A transmitter station may send a signaling message on one reserved subcarrier set that may be selected based on the power class of the transmitter station, the distance from the transmitter station to a receiver station, etc.

In one design, different resources may be reserved for different cells for sending signaling messages of a particular type. This per-cell design may avoid collisions between signaling messages from different cells. In another design, the same resources may be reserved for all cells for sending signaling messages of the particular type. This global design may reduce overhead for sending signaling messages. In general, some resources (e.g., a set of subcarriers) may be reserved for sending signaling messages (e.g., reduce interference requests). Multiple transmitter stations may use the same resources (e.g., the same reserved subcarriers) to send signaling messages. In some cases, the transmitter stations may send the same messages, and these messages may overlap at a receiver station in a single frequency network (SFN) manner.

The signaling messages in FIGS. 2 and 3, as well as other signaling messages used to support communication between base stations and UEs, may be sent in various manners. A signaling message of a particular type (e.g., a reduce interference request) may be sent on resources reserved for sending signaling messages of that type. Some exemplary designs for sending signaling messages are described below.

In a first design, a signaling message (e.g., a reduce interference request) may be sent by mapping it to at least one specific subcarrier, e.g., one specific subcarrier. The signaling message may include a total of B information bits, where $B \geq 1$ and may be dependent on the amount of information to send. The signaling message may have one of M possible values, where $M = 2^B$. In one design, a set of M subcarriers may be reserved for sending the signaling message, e.g., as shown in FIG. 4A or 4B. The signaling message may then be sent on one of the M subcarriers in the reserved set.

Figure 5:
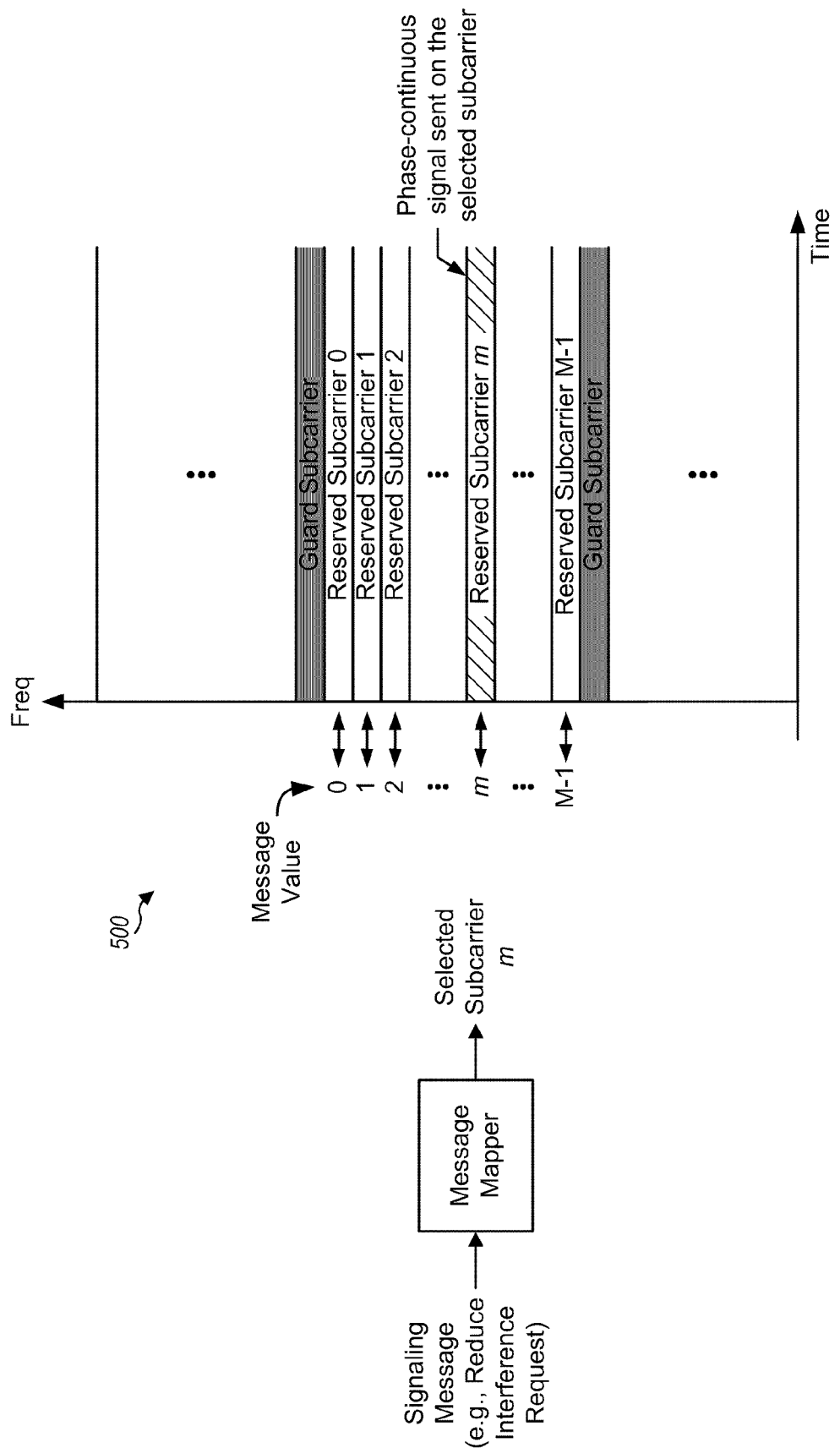
FIG. 5 shows message transmission with subcarrier mapping.

FIG. 5 shows a design of a message transmission scheme 500 utilizing subcarrier mapping. A signaling message may be sent with a reserved set of M subcarriers with indices of 0 through M−1. For example, a 3-bit reduce interference request may be sent with a set of 8 subcarriers, a 4-bit request may be sent with a set of 16 subcarriers, etc. Each of the M possible values of the signaling message may be mapped to a different one of the M subcarriers. For example, message values of 0 through M−1 may be mapped to subcarriers 0 through M−1, respectively. The signaling message may be mapped to a specific subcarrier in the reserved set based on the message value. A signal may then be sent on the selected subcarrier at a suitable transmit power level (e.g., at full power) and over a suitable time duration (e.g., a predetermined number of symbol periods) to ensure reliable reception of the signaling message. No signals may be sent on the M−1 remaining subcarriers in the reserved set.

In general, any information for a signaling message may be hashed to different subcarriers in the reserved set. In one design, the M subcarriers in the reserved set may be associated with different priorities of a signaling message. For example, eight subcarriers may be used to support eight priority levels. The selected subcarrier may then be associated with the priority of a signaling message sent on the subcarrier. In another design, different cell or UE identities (IDs) may be hashed to different subcarriers in the reserved set. The selected subcarrier may then be associated with the ID of a base station or a UE sending the signaling message. In yet another design, a combination of priority and cell or UE ID may be hashed to different subcarriers in the reserved set. For example, a signaling message may comprise a 3-bit cell or UE ID and a 1-bit priority. The four bits of the signaling message may be used to select one of 16 subcarriers in the reserved set. Other combination of information may also be mapped to different subcarriers. More than one subcarriers may also be selected based on a message value.

For the first design, a receiver station may detect for signaling messages (e.g., reduce interference requests) as follows. The receiver station may obtain time-domain samples for a received signal. In each symbol period, a fast Fourier transform (FFT) may be performed on the time-domain samples to obtain frequency-domain received symbols for all $N_{FFT}$ total subcarriers. The received power of each subcarrier in the reserved set may be determined based on the received symbols for that subcarrier. The received power of each subcarrier may be compared against a power threshold to determine whether a signal has been sent on that subcarrier. For each subcarrier on which a signal is detected, a message value for a signaling message may be recovered based on the index of that subcarrier. In one design, the power threshold may be a static value, which may be determined based on computer simulation or empirical measurement to obtain good detection performance. In another design, the power threshold may be determined dynamically, e.g., based on the received powers of all reserved subcarriers, the received powers of all available subcarriers, etc.

Message transmission scheme 500 may be used for both synchronous and asynchronous networks. In one design, a phase-continuous signal may be sent on a selected subcarrier for a signaling message. A phase-continuous signal is a signal having little or no phase discontinuity across consecutive symbol periods, so that the start of a waveform (e.g., a sinusoidal) for a given symbol period is a continuation of a waveform for a previous symbol period. The use of a phase-continuous signal may allow a receiver station to detect the signal on the selected subcarrier with little ICI even if its FFT window is not time aligned with the symbol boundary of a transmitter station due to asynchronous operation.

Message transmission scheme 500 can gracefully handle collisions of signaling messages on the reserved set of subcarriers. If multiple transmitter stations send signaling messages on different subcarriers at or near the same time, then a receiver station can detect the signaling message from each transmitter station and can respond to each signaling message. If multiple transmitter stations send signaling messages on the same subcarrier at or near the same time, then the receiver station may receive duplicate signaling messages on the subcarrier and can respond to the duplicate signaling messages. The signaling messages may thus be sent in a similar manner as a broadcast transmission in an SFN network.

In a second design, a reduce interference request may be sent with time and frequency spreading. In this design, M orthogonal sequences may be defined and may be Walsh sequences or some other spreading sequences, which may have good correlation properties and may or may not be orthogonal to one another. Each orthogonal sequence may have a length of M and may comprise M symbols. Each of M possible values of the reduce interference request may be mapped to a different one of the M orthogonal sequences. The reduce interference request may be sent using one of the M orthogonal sequences selected based on the value of the reduce interference request.

Figure 6:
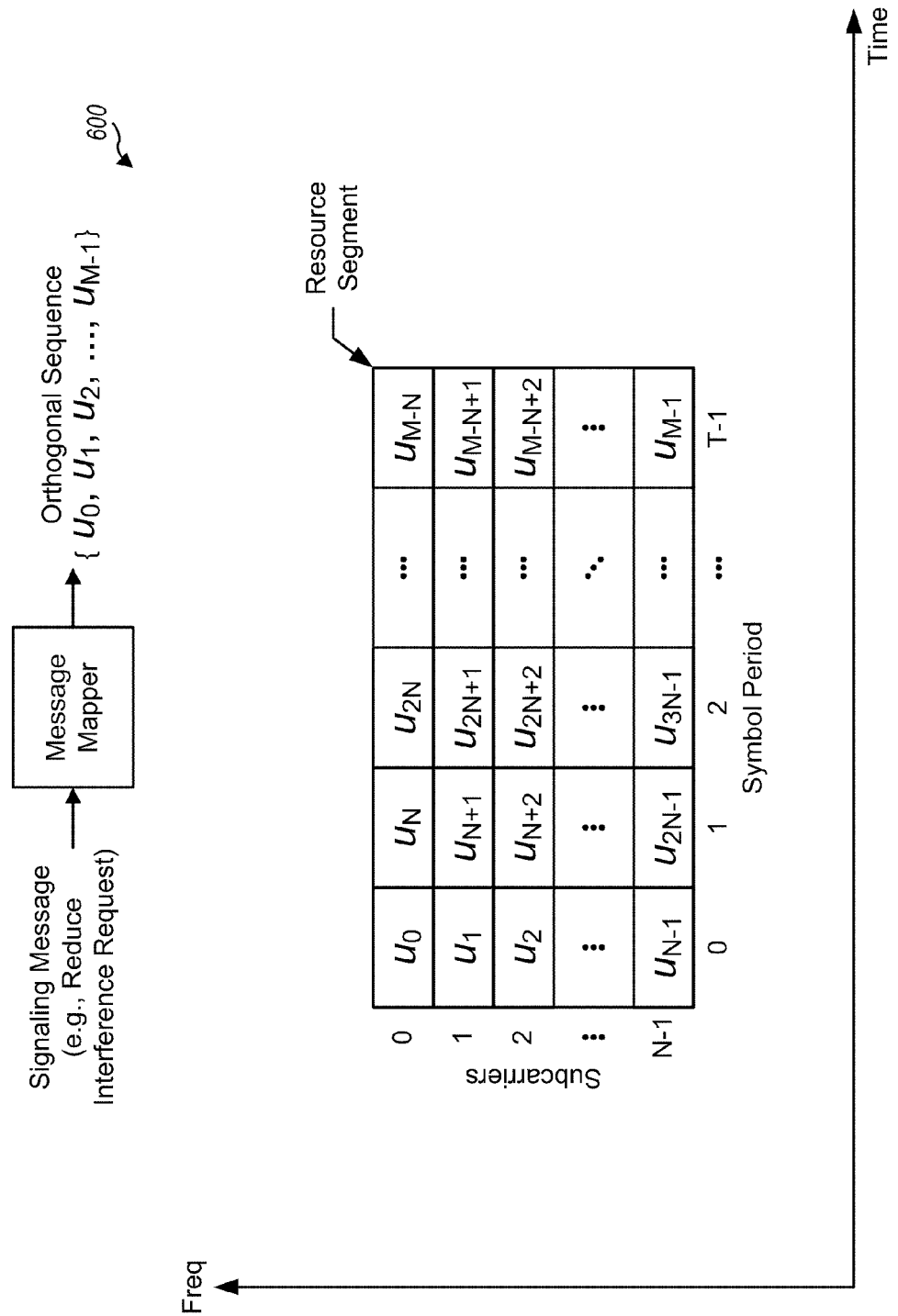
FIG. 6 shows message transmission with time and frequency spreading.

FIG. 6 shows a design of a message transmission scheme 600 utilizing time and frequency spreading. A reduce interference request may be mapped to a specific orthogonal sequence of length M based on the message value. The selected orthogonal sequence may be sent on a resource segment covering N subcarriers in T symbol period and including M resource elements, where M=N·T. Each resource element may cover one subcarrier in one symbol period and may be used to send one symbol, which may be a real or complex value. The M symbols in the selected orthogonal sequence may be mapped to the M resource elements in the resource segment in a predetermined order. For example, the M symbols may be mapped (i) across all N subcarriers, one symbol period at a time, as shown in FIG. 6, or (ii) across all T symbol periods, one subcarrier at a time.

A resource segment may cover N subcarriers in T symbol periods, as shown in FIG. 6. In one design, a set of N subcarriers may be reserved for sending reduce interference requests. Detection performance may be improved if the N subcarriers are contiguous. A resource segment may be formed on the N subcarriers in the reserved set starting in any symbol period. This design may be used for both synchronous and asynchronous networks. In another design, specific resource segments may be reserved for sending reduce interference requests. This design may be more applicable for a synchronous network. The resource segments reserved for sending reduce interference requests may also be defined in other manners.

In one design, a preamble may be sent prior to an orthogonal sequence for a reduce interference request. The preamble may be a specific sequence that may be sent on the N subcarriers in one symbol period prior to the orthogonal sequence. The preamble may be used to detect for the presence of the reduce interference request For the second design, a receiver station may detect for reduce interference requests as follows. The preamble, if sent, may first be detected to ascertain the presence of a reduce interference request. M received symbols may then be obtained from M resource elements in a resource segment. The M received symbols may be despread with each of the M possible orthogonal sequences to obtain M despread symbols, one despread symbol for each orthogonal sequence. The received power of each despread symbol may be compared against a power threshold, and a reduce interference request corresponding to that despread symbol may be detected if the received power exceeds the power threshold. In one design, the power threshold may be a static value, which may be determined based on computer simulation or empirical measurement to obtain good detection performance. In another design, the power threshold may be determined dynamically, e.g., based on the received powers of the N subcarriers in the reserved set when reduce interference requests are not present.

Message transmission scheme 600 may allow a reduce interference request to be sent with more transmit power and to be spread across multiple subcarriers and multiple symbol periods in a resource segment. More transmit power for the reduce interference request may improve detection performance. The time and frequency spreading may provide diversity, which may also improve detection performance. Message transmission scheme 600 can also handle collisions of reduce interference requests. If multiple transmitter stations send reduce interference requests in the same resource segment, then a receiver station can detect the reduce interference request from each transmitter station and can respond to each reduce interference request.

In a third design, a reduce interference request may be sent with frequency spreading. The reduce interference request may be processed (e.g., encoded and modulated) to obtain modulation symbols. Each modulation symbol may be spread to obtain a corresponding data sequence. The data sequence for each modulation symbol may be sent across a set of subcarriers to achieve frequency spreading.

Figure 7:
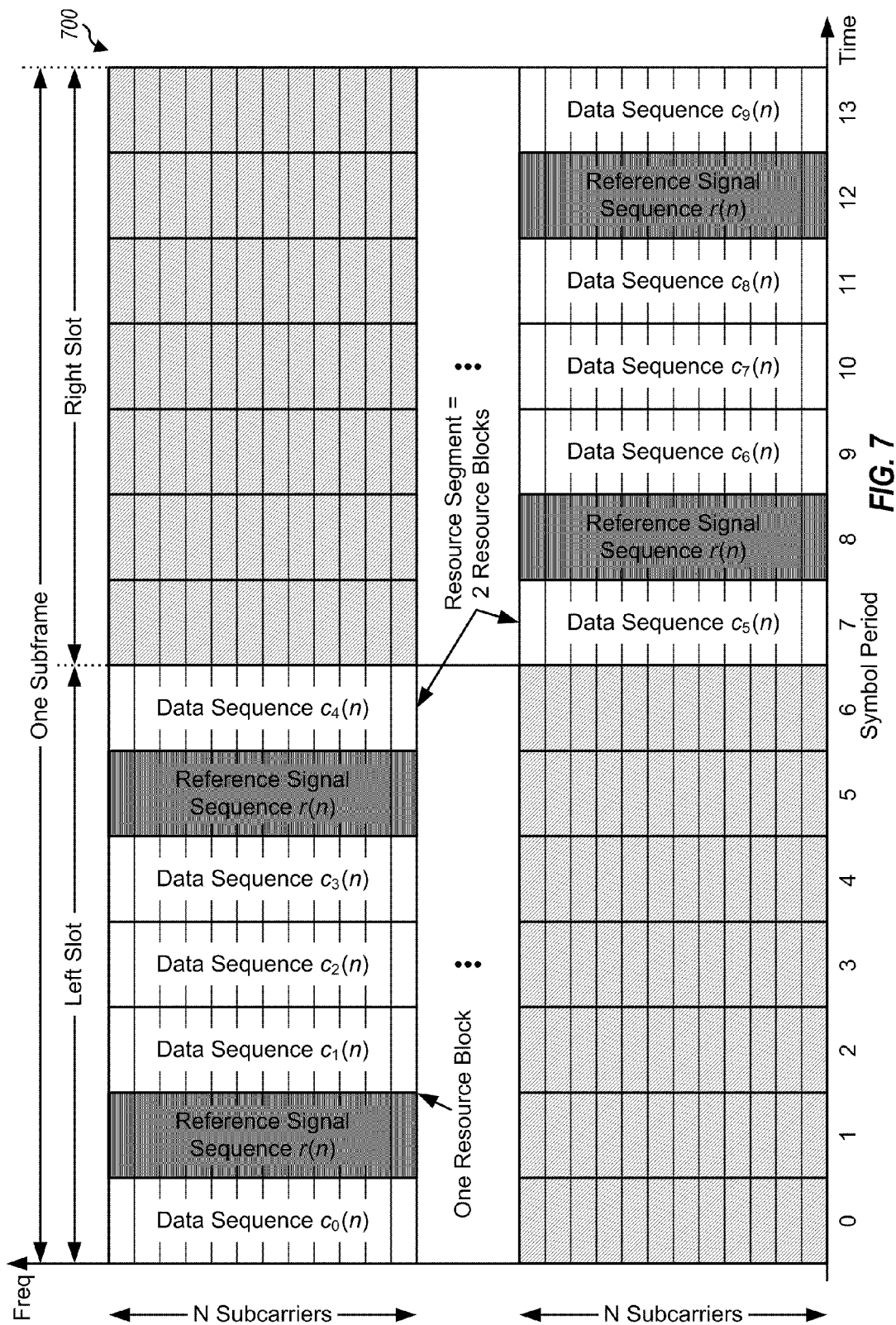
FIG. 7 shows message transmission scheme with frequency spreading.

FIG. 7 shows a design of a message transmission scheme 700 utilizing frequency spreading. The transmission timeline may be partitioned into units of subframes. Each subframe may have a predetermined duration, e.g., one millisecond (ms), and may be partitioned into two slots. The two slots of one subframe may include 14 symbol periods with indices of 0 through 13 for a normal cyclic prefix in LTE. A number of resource blocks may be defined for each slot. Each resource block may include N subcarriers (e.g., 12 subcarriers) in one slot in LTE.

In one design, a reduce interference request may be encoded to obtain code bits, which may then be mapped to ten modulation symbols d(0) through d(9). Ten data sequences may be generated with the ten modulation symbols, as follows:

$$c_t(n) = d(t) \cdot r(n), \text{ for } n=0, \ldots, N-1 \text{ and } t=0, \ldots, 9, \qquad \text{Eq (1)}$$

where r(n) is a reference signal sequence of length N, d(t) is the t-th modulation symbol for the reduce interference request, and $c_t(n)$ is the t-th data sequence for the reduce interference request.

A set of reference signal sequences having zero or low cross-correlation properties may be defined. For example, the set may include Zadoff-Chu sequences, Chu sequences, Frank sequences, generalized chirp-like (GCL) sequences, Walsh sequences, m-sequences, etc. Different transmitter stations may simultaneously send reduce interference requests using different reference signal sequences, which may be considered as orthogonal sequences. A receiver station can detect each transmitted reduce interference request by performing coherent detection with the reference signal sequence used for that reduce interference request.

Ten data sequences $c_0(n)$ through $c_9(n)$ may be obtained with the ten modulation symbols d(0) through d(9), respectively. The ten data sequences may be sent in two resource blocks, which may occupy different sets of subcarriers to achieve frequency diversity, as shown in FIG. 7. For the first resource block in the left slot, five data sequences $c_0(n)$ through $c_4(n)$ may be sent in symbol periods 0, 2, 3, 4 and 6, and the reference signal sequence $r(n)$ may be sent in symbol periods 1 and 5, as shown in FIG. 7. For the second resource block in the right slot, five data sequences $c_5(n)$ through $c_9(n)$ may be sent in symbol periods 7, 9, 10, 11 and 13, and the reference signal sequence $r(n)$ may be sent in symbol periods 8 and 12, as also shown in FIG. 7.

For the third design, a receiver station may detect for reduce interference requests as follows. For each resource block, a channel estimate comprising channel gains for the N subcarriers in the resource block may be derived based on the reference signal sequences received in that resource block. Coherent demodulation may then be performed for each received data sequence with the channel estimate to obtain a corresponding detected data sequence. The coherent demodulation may remove the effects of the channel gains from the received data sequences. Ten detected data sequences may be obtained from two resource blocks in one subframe. The ten detected data sequences may be correlated with each possible reference signal sequence to obtain a set of ten despread symbols for that reference signal sequence, one despread symbol for each detected data sequence. Each set of despread symbols with received power exceeding a power threshold may be retained, and the remaining sets of despread symbols may be discarded. For each retained set of despread symbols, log-likelihood ratios (LLRs) may be computed based on the ten despread symbols and may be decoded to obtain a reduce interference request sent in the two resource blocks.

FIG. 7 shows a specific design of sending a reduce interference request with frequency spreading. In general, a reduce interference request may be spread to obtain any number of data sequences, which may be sent in a sufficient number of resource elements. A reference signal sequence may be sent in a sufficient number of symbol periods and on a sufficient number of subcarriers and may be used for coherent detection of the data sequences.

In another aspect, power control of an interfering station may be achieved via a reduce interference request. In one design of power control of an interfering UE, a serving base station may send a reduce interference request at a transmit power level of $P_{TX\_msg}$, which may the determined as follows:

$$P_{TX\_msg} = \frac{P_C^2}{I_{target}}, \quad \text{Eq (2)}$$

where $P_C$ is a reference value that is described below, and
$I_{target}$ is a target interference level for the serving base station.

The interfering UE may receive the reduce interference request at a received power level of $P_{RX\_msg}$, which may be expressed as:

$$P_{RX\_msg} = \frac{h^2 \cdot P_C^2}{I_{target}}, \quad \text{Eq (3)}$$

where h is a channel gain from the serving base station to the interfering UE.

The interfering UE may honor the reduce interference request and may determine its transmit power $P_d$, as follows:

$$P_d = \frac{P_C^2}{P_{RX\_msg}} = \frac{I_{target}}{h^2}. \quad \text{Eq (4)}$$

The interfering UE may use transmit power of $P_d$ or lower for data transmission. The data transmission from the UE would then cause interference of $I_{target}$ or lower at the serving base station, assuming only one interfering UE and symmetric downlink and uplink channels.

Power control of an interfering base station may be performed in a similar manner. A UE may send a reduce interference request at a transmit power level of $P_{TX\_msg}$. The interfering base station may receive the reduce interference request at a received power level of $P_{RX\_msg}$. The interfering base station may honor the request and may reduce its transmit power to $P_d$ or lower. Data transmission from the interfering base station may then cause interference of $I_{target}$ or lower at the UE, assuming one interfering base station and symmetric downlink and uplink channels.

For power control, the transmit power of a reduce interference request may be set to achieve a target interference level at the sender of the request. The target interference level may be selected based on the desired data performance and may also be set to account for errors in the number of interfering stations, fade imbalance between the downlink and uplink, calibration errors between transmit and receive chains at different stations, etc.

In one design, all base stations may use the same $P_C$ value. In another design, base station of different power classes may use different $P_C$ values. For example, high-power macro base stations may use a first $P_C$ value, and low-power pico and femto base stations may use a second $P_C$ value, which may be lower than the first $P_C$ value. In one design, all UEs may use the same $P_C$ value, which may or may not match the $P_C$ value(s) used by the base stations. In one design, multiple sets of subcarriers may be reserved for sending reduce interference requests, and different $P_C$ values may be used for different reserved subcarrier sets. A UE may select one of the reserved subcarrier sets for sending a reduce interference request based on the distance from the UE to an interfering base station.

Figures 8, 9:
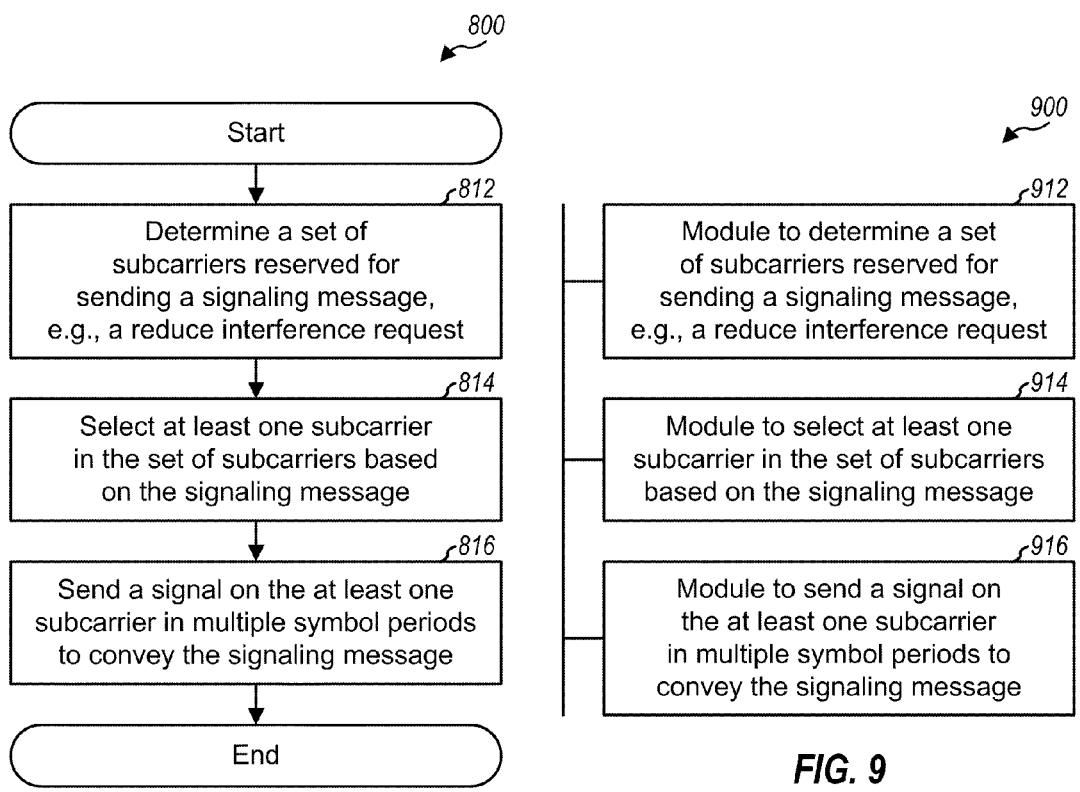
FIG. 8 shows a process for sending signaling with subcarrier mapping.
FIG. 9 shows an apparatus for sending signaling with subcarrier mapping.

FIG. 8 shows a design of a process 800 for sending signaling in a wireless network. Process 800 may be performed by a transmitter station, which may be a base station, a UE, a relay, or some other entity. The transmitter station may determine a set of subcarriers reserved for sending a signaling message (block 812). In one design, the signaling message may comprise a reduce interference request asking at least one interfering station to reduce interference to the transmitter station. The signaling message may also comprise some other type of message.

The transmitter station may select at least one subcarrier in the set of subcarriers based on the signaling message (block 814). In one design, the signaling message may have a value within a range of 0 to M−1, where M may be greater than one. The subcarriers in the set may be assigned indices 0 to M−1. The transmitter station may then select a subcarrier with an index of X based on a value of X for the signaling message, where X is within a range of 0 to M−1.

The transmitter station may send a signal (e.g., a phase-continuous signal) on the at least one subcarrier in multiple symbol periods to convey the signaling message (block 816). In one design, the transmitter station may send the signal to at least one receiver station operating asynchronously with the transmitter station. The transmitter station may set the transmit power of the signal to achieve good detection performance. The transmit power may also be set based on a target interference level of the transmitter station, as described above.

In one design, multiple sets of subcarriers may be reserved for transmission of signaling messages by base stations of different power classes. The transmitter station may then select one of the multiple sets of subcarriers based on its power class. In another design, multiple sets of subcarriers may be reserved for transmission of signaling messages at different transmit power levels. The transmitter station may then select one of the multiple sets of subcarriers based on the transmit power for the signaling message. In yet another design, multiple sets of subcarriers may be reserved for transmission of signaling messages in different cells in the wireless network. The transmitter station may then select one of the multiple sets of subcarriers based on a cell for the signaling message. The multiple sets of subcarriers may also be reserved for other criteria. In an alternative design, a single set of subcarriers may be reserved for sending signaling messages by all base stations, at all transmit power levels, in all cells, etc.

FIG. 9 shows a design of an apparatus 900 for sending signaling in a wireless network. Apparatus 900 includes a module 912 to determine a set of subcarriers reserved for sending a signaling message, e.g., a reduce interference request, a module 914 to select at least one subcarrier in the set of subcarriers based on the signaling message, and a module 916 to send a signal on the at least one subcarrier in multiple symbol periods to convey the signaling message.

FIG. 10 shows a design of a process 1000 for receiving signaling in a wireless network. Process 1000 may be performed by a receiver station, which may be a base station, a UE, a relay, or some other entity. The receiver station may determine a set of subcarriers reserved for sending signaling messages (block 1012). The receiver station may obtain received symbols for each subcarrier in the set of subcarriers (block 1014). In one design, the receiver station may operate asynchronously with transmitter stations sending signaling messages and may obtain the received symbols for each subcarrier based on its symbol timing. The receiver station may determine the received power of each subcarrier based on the received symbols for that subcarrier (block 1016).

The receiver station may detect for signaling messages sent on the set of subcarriers based on the received power of each subcarrier (block 1018). Each signaling message may be sent on at least one specific subcarrier in multiple symbol periods. In one design, the receiver station may compare the received power of each subcarrier against a threshold. The receiver station may detect a signaling message on each subcarrier with received power exceeding the threshold. The receiver station may obtain information for each detected signaling message based on the specific subcarrier on which that signaling message is detected.

In one design, the receiver station may determine multiple sets of subcarriers reserved for sending signaling messages at different transmit power levels, by base stations of different power classes, in different cells, etc. The receiver station may detect for signaling messages sent on each of the multiple sets of subcarriers.

In one design, the receiver station may obtain reduce interference requests from the detected signaling messages (block 1020). The receiver station may reduce its transmit power based on the reduce interference requests (block 1022). In one design, the receiver station may determine the received power of a detected reduce interference request. The receiver station may then determine its transmit power based on the received power of the detected reduce interference request, as described above.

FIG. 11 shows a design of an apparatus 1100 for receiving signaling in a wireless network. Apparatus 1100 includes a module 1112 to determine a set of subcarriers reserved for sending signaling messages, a module 1114 to obtain received symbols for each subcarrier in the set of subcarriers, a module 1116 to determine received power of each subcarrier in the set of subcarriers based on the received symbols for the subcarrier, a module 1118 to detect for signaling messages sent on the set of subcarriers based on the received power of each subcarrier, a module 1120 to obtain reduce interference requests from the detected signaling messages, and a module 1122 to reduce transmit power based on the reduce interference requests.

FIG. 12 shows a design of a process 1200 for sending signaling in a wireless network. Process 1200 may be performed by a first station, which may be a base station, a UE, a relay, or some other entity. The first station may generate a reduce interference request asking at least one interfering station to reduce interference to the first station (block 1212). The first station may determine an orthogonal resource to use for the reduce interference request from among orthogonal resources available for sending reduce interference requests (block 1214). The first station may send the reduce interference request based on the orthogonal resource to the at least one interfering station (block 1216).

In one design, the orthogonal resource may comprise an orthogonal sequence selected from among multiple orthogonal sequences. In another design, the orthogonal resource may comprise a time interval selected from among multiple time intervals. In yet another design, the orthogonal resource may comprise a frequency resource selected from among multiple frequency resources. In general, the orthogonal resource may comprise any code, time, frequency, and/or other resource.

In one design, the orthogonal resource may comprise an orthogonal sequence. The first station may spread the reduce interference request across a resource segment based on the orthogonal sequence. The resource segment may cover multiple subcarriers in multiple symbol periods. The first station may generate a signal comprising the reduce interference request spread across the resource segment. The first station may then send the signal to the at least one interfering station.

In one design, the first station may select the orthogonal sequence from among multiple orthogonal sequences based on a message value of the reduce interference request. The first station may then map the selected orthogonal sequence across the resource segment, e.g., as shown in FIG. 6. In another design, the orthogonal resource may comprise a reference signal sequence. The first station may process the reduce interference request to obtain multiple modulation symbols. The first station may spread the multiple modulation symbols with the reference signal sequence to obtain multiple data sequences, one data sequence for each modulation symbol, e.g., as shown in equation (1). The first station may map the multiple data sequences to the resource segment, with each data sequence being mapped across the multiple subcarriers in one symbol period, e.g., as shown in FIG. 7. The first station may also spread the reduce interference request across time and/or frequency in other manners. For example, the first station may spread the reduce interference request across time in multiple symbol periods on one subcarrier, across frequency on multiple subcarriers in one symbol period, etc.

In one design, the first station may determine the transmit power for the reduce interference request based on a target interference level for the first station. The first station may then send the reduce interference request at the determined transmit power. In another design, the first station may send the reduce interference request at a fixed transmit power level.

In one design, the first station may send the reduce interference request as a unicast message to each interfering station. In another design, the first station may send the reduce interference request as a broadcast message to all interfering stations. The first station may send the reduce interference request on a Physical Uplink Control Channel (PUCCH) in LTE or on some other channel.

FIG. 13 shows a design of an apparatus 1300 for sending signaling in a wireless network. Apparatus 1300 includes a module 1312 to generate a reduce interference request asking at least one interfering station to reduce interference to a first station, a module 1314 to determine an orthogonal resource to use for the reduce interference request from among orthogonal resources available for sending reduce interference requests, and a module 1316 to send the reduce interference request based on the orthogonal resource to the at least one interfering station.

FIG. 14 shows a design of a process 1400 for receiving signaling in a wireless network. Process 1400 may be performed by a first station, which may be a base station, a UE, a relay, or some other entity. The first station may detect for reduce interference requests sent based on orthogonal resources available for sending the reduce interference requests (block 1412). The available orthogonal resources may comprise code, time, frequency and/or other resources. In one design, the available orthogonal resources may comprise multiple orthogonal sequences. The first station may obtain received symbols from a resource segment covering multiple subcarriers in multiple symbol periods. The first station may despread the received symbols based on the multiple orthogonal sequences to obtain multiple despread symbols. The first station may then detect for reduce interference requests sent in the resource segment based on the multiple despread symbols.

A transmitter station may send a reduce interference request by spreading it across the resource segment with one of the multiple orthogonal sequences. The first station may despread the received symbols in a manner complementary to the spreading performed by the transmitter station. In one design of blocks 1412, which may be applicable for the design shown in FIG. 6, the first station may despread the received symbols with each orthogonal sequence to obtain a corresponding despread symbol. The first station may determine the received power of each despread symbol and may declare a reduce interference request for each despread symbol with received power exceeding a threshold.

In another design of blocks 1412, which may be applicable for the design shown in FIG. 7, the first station may despread the received symbols for each symbol period in the resource segment with each orthogonal sequence to obtain a despread symbol of each orthogonal sequence in each symbol period. The first station may determine the received power for each orthogonal sequence based on the despread symbols for that orthogonal sequence. For each orthogonal sequence with received power exceeding a threshold, the first station may decode all despread symbols obtained with that orthogonal sequence to recover a detected reduce interference request.

The first station my reduce its transmit power based on the detected reduce interference requests (block 1414). In one design, the first station may determine the received power of a detected reduce interference request and may then determine its transmit power based on the received power of the detected reduce interference request, as described above. The first station may also determine its transmit power in other manners.

FIG. 15 shows a design of an apparatus 1500 for receiving signaling in a wireless network. Apparatus 1500 includes a module 1512 to detect for reduce interference requests sent based on orthogonal resources available for sending the reduce interference requests, and a module 1514 to reduce transmit power of a first station based on the detected reduce interference requests.

The modules in FIGS. 9, 11, 13 and 15 may comprise processors, electronics devices, hardware devices, electronics components, logical circuits, memories, software codes, firmware codes, etc., or any combination thereof.

Figure 16:
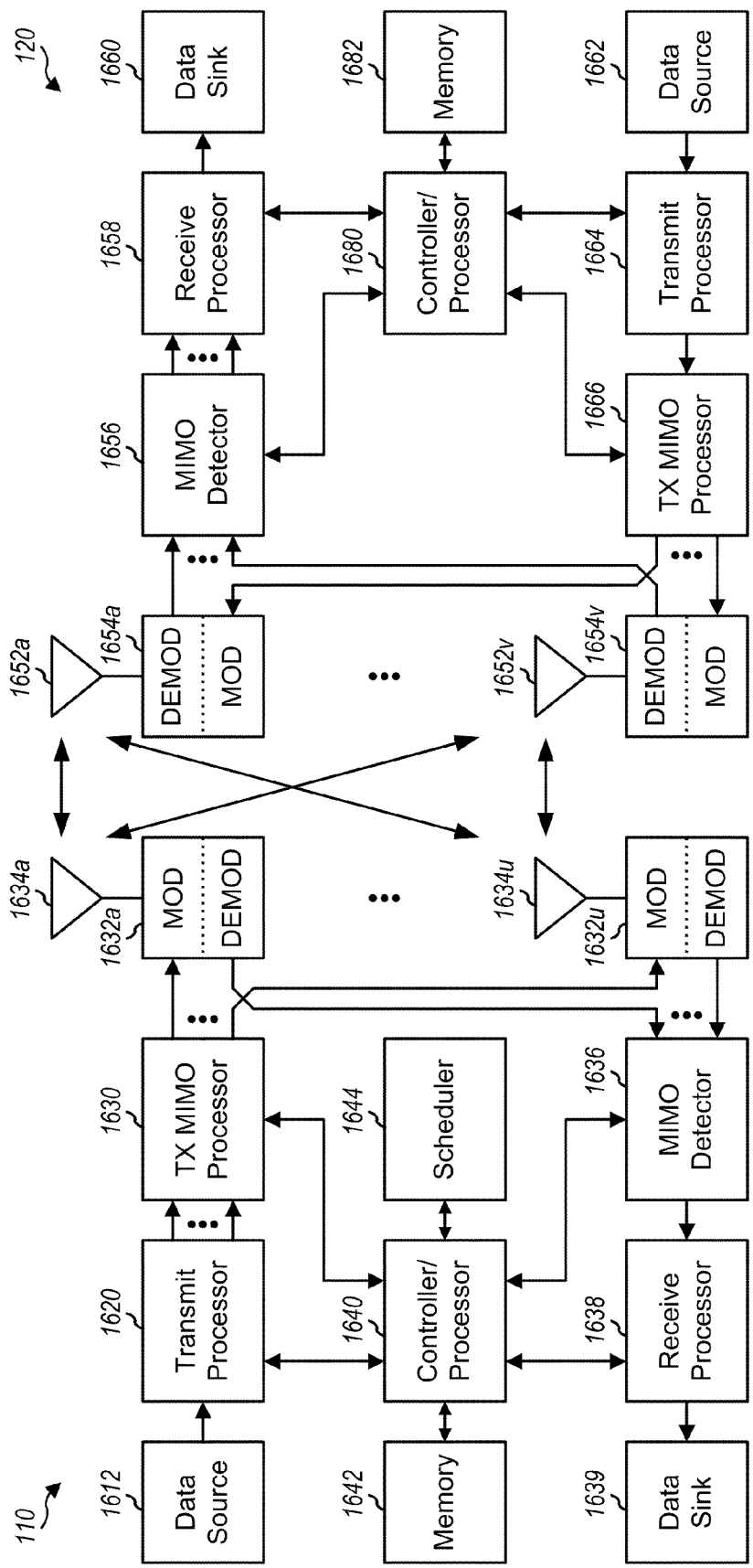
FIG. 16 shows a block diagram of a base station and a UE.

FIG. 16 shows a block diagram of a design of a base station 110 and a UE 120, which may be one of the base stations and one of the UEs in FIG. 1. Base station 110 may be equipped with U antennas 1634a through 1634u, and UE 120 may be equipped with V antennas 1652a through 1652v, where in general $U \geq 1$ and $V \geq 1$.

At base station 110, a transmit processor 1620 may receive data for one or more UEs from a data source 1612, process (e.g., encode, interleave, and modulate) the data, and provide data symbols. Transmit processor 1620 may also receive control information (e.g., for the messages shown in FIGS. 2 and 3) from a controller/processor 1640, process the control information, and provide control symbols. Transmit processor 1620 may also generate reference signal symbols for one or more reference signals or pilots. A transmit (TX) multiple-input multiple-output (MIMO) processor 1630 may perform spatial processing (e.g., preceding) on the data symbols, the control symbols, and/or the reference signal symbols, if applicable, and may provide U output symbol streams to U modulators (MODs) 1632a through 1632u. Each modulator 1632 may process a respective output symbol stream (e.g., for OFDM, etc.) to obtain an output sample stream. Each modulator 1632 may further process (e.g., convert to analog, amplify, filter, and upconvert) the output sample stream to obtain a downlink signal. U downlink signals from modulators 1632a through 1632t may be transmitted via U antennas 1634a through 1634u, respectively.

At UE 120, antennas 1652a through 1652v may receive the downlink signals from base station 110 and may provide received signals to demodulators (DEMODs) 1654a through 1654v, respectively. Each demodulator 1654 may condition (e.g., filter, amplify, downconvert, and digitize) a respective received signal to obtain input samples. Each demodulator 1654 may further process the input samples (e.g., for OFDM, etc.) to obtain received symbols. A MIMO detector 1656 may obtain received symbols from all V demodulators 1654a through 1654v, perform MIMO detection on the received symbols if applicable, and provide detected symbols. A receive processor 1658 may process (e.g., demodulate, deinterleave, and decode) the detected symbols, provide decoded data for UE 120 to a data sink 1660, and provide decoded control information to a controller/processor 1680.

On the uplink, at UE 120, a transmit processor 1664 may receive and process data from a data source 1662 and control information from controller/processor 1680. Transmit processor 1664 may also generate reference signal symbols for one or more reference signals. The symbols from transmit processor 1664 may be precoded by a TX MIMO processor 1666 if applicable, further processed by modulators 1654a through 1654v, and transmitted to base station 110. At base station 110, the uplink signals from UE 120 may be received by antennas 1634, processed by demodulators 1632, detected by a MIMO detector 1636 if applicable, and further processed by a receive processor 1638 to obtain the data and control information sent by UE 120.

Controllers/processors 1640 and 1680 may direct the operation at base station 110 and UE 120, respectively. Processor 1640 and/or other processors and modules at base station 110 may perform or direct process 800 in FIG. 8, process 1000 in FIG. 10, process 1200 in FIG. 12, process 1400 in FIG. 14, and/or other processes for the techniques described herein. Processor 1680 and/or other processors and modules at UE 120 may also perform or direct process 800, process 1000, process 1200, process 1400, and/or other processes for the techniques described herein. Memories 1642 and 1682 may store data and program codes for base station 110 and UE 120, respectively. A scheduler 1644 may schedule UEs for data transmission on the downlink and uplink and may provide resource grants for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of sending signaling in a wireless communication network, comprising:
    determining, by a processor, a set of subcarriers reserved for sending a reduce interference request to a base station, wherein each subcarrier in the reserved set of subcarriers is associated with a different priority level;
    determining, by the processor, a priority level of the reduce interference request;
    selecting, by the processor, a subcarrier in the reserved set of subcarriers based on the priority level of the reduce interference request, wherein the priority level associated with the selected subcarrier corresponds to the priority level of the reduce interference request; and
    sending, by a transmitter, the reduce interference request on the selected subcarrier in multiple symbol periods to the base station, wherein the priority level of the selected subcarrier conveys the priority level of the reduce interference request.

2. The method of claim 1, wherein the sending the reduce interference request comprises sending the reduce interference request from a transmitter station to the base station operating asynchronously with the transmitter station.

3. The method of claim 1, wherein the reduce interference request comprises a number of bits within a range of 0 to M−1, where M is a finite integer greater than one, wherein the subcarriers in the reserved set of subcarriers are assigned indices 0 to M−1, and wherein a subcarrier with an index of X is selected based on a value of X for the reduce interference request, where X is within a range of 0 to M−1.

4. The method of claim 1, wherein the sending the reduce interference request comprises sending a phase-continuous signal on the selected subcarrier in the multiple symbol periods to convey the reduce interference request.

5. The method of claim 1, wherein the determining the reserved set of subcarriers comprises selecting one of multiple sets of subcarriers based on a power class of the base station, the multiple sets of subcarriers being reserved for transmission of signaling messages by base stations of different power classes.

6. The method of claim 1, wherein the determining the reserved set of subcarriers comprises selecting one of multiple sets of subcarriers based on a transmit power for the reduce interference request, the multiple sets of subcarriers being reserved for transmission of reduce interference requests at different transmit power levels.

7. The method of claim 1, wherein the reserved set of subcarriers is reserved for sending reduce interference requests in one cell in the wireless communication network, and wherein multiple sets of subcarriers are reserved for sending reduce interference requests in different cells in the wireless communication network.

8. The method of claim 1, wherein the reserved set of subcarriers is reserved for sending reduce interference requests in all cells in the wireless communication network.

9. An apparatus for wireless communication, comprising:
means for determining a set of subcarriers reserved for sending a reduce interference request to a base station, wherein each subcarrier in the reserved set of subcarriers is associated with a different priority level;
means for determining a priority level of the reduce interference request;
means for selecting a subcarrier in the reserved set of subcarriers based on the priority level of the reduce interference request, wherein the priority level associated with the selected subcarrier corresponds to the priority level of the reduce interference request; and
means for sending the reduce interference request on the selected subcarrier in multiple symbol periods to the base station, wherein the priority level of the selected subcarrier conveys the priority level of the reduce interference request.

10. The apparatus of claim 9, wherein the means for sending the reduce interference request comprises means for sending the reduce interference request from a transmitter station to at least one receiver station operating asynchronously with the transmitter station.

11. The apparatus of claim 9 wherein the means for sending the reduce interference request comprises means for sending a phase-continuous signal on the selected subcarrier in the multiple symbol periods to convey the reduce interference request.

12. An apparatus for wireless communication, comprising:
at least one processor configured to:
determine a set of subcarriers reserved for sending a reduce interference request to a base station, wherein each subcarrier in the reserved set of subcarriers is associated with a different priority level;
determine a priority level of the reduce interference request;
select a subcarrier in the reserved set of subcarriers based on the priority level of the reduce interference request, wherein the priority level associated with the selected subcarrier corresponds to the priority level of the reduce interference request; and
send the reduce interference request on the selected subcarrier in multiple symbol periods to the base station, wherein the priority level of the selected subcarrier conveys the priority level of the reduce interference request; and
memory coupled to the at least one processor.

13. The apparatus of claim 12 wherein the at least one processor is configured to send the reduce interference request from a transmitter station to at least one receiver station operating asynchronously with the transmitter station.

14. The apparatus of claim 12, wherein the at least one processor is configured to send a phase-continuous signal on the selected subcarrier in the multiple symbol periods to convey the reduce interference request.

15. A computer program product, comprising:
a non-transitory computer-readable medium comprising:
code for causing at least one computer to determine a set of subcarriers reserved for sending a reduce interference request to a base station, wherein each subcarrier in the reserved set of subcarriers is associated with a different priority level;
code for causing the at least one computer to determine a priority level of the reduce interference request;
code for causing the at least one computer to select a subcarrier in the reserved set of subcarriers based on the priority level of the reduce interference request, wherein the priority level associated with the selected subcarrier corresponds to the priority level of the reduce interference request; and
code for causing the at least one computer to send the reduce interference request on the selected subcarrier in multiple symbol periods to the base station, wherein the priority level of the selected subcarrier conveys the priority level of the reduce interference request.

* * * * *